United States Patent [19]

Lauterbach et al.

[11] Patent Number: 4,993,922

[45] Date of Patent: Feb. 19, 1991

[54] AIR COMPRESSOR UNLOADER SYSTEM

[75] Inventors: Jerre F. Lauterbach; Nathan Ritchie, both of Columbus; Richard F. Miller, North Vernon, all of Ind.

[73] Assignee: Holset Engineering Company, Inc., Madison, Ind.

[21] Appl. No.: 278,179

[22] Filed: Nov. 30, 1988

[51] Int. Cl.⁵ ............................................. F04B 21/02
[52] U.S. Cl. ..................................... 417/279; 417/297
[58] Field of Search ......................... 417/279, 295, 297

[56] References Cited

U.S. PATENT DOCUMENTS

| | | | |
|---|---|---|---|
| 2,626,100 | 1/1953 | McIntyre | 417/44 |
| 2,717,612 | 9/1955 | Affleck | 137/102 |
| 2,804,878 | 9/1957 | Fishwood | 137/102 |
| 2,895,665 | 7/1959 | McSweeney | 417/44 |
| 2,961,148 | 11/1960 | Courtney | 137/115 |
| 2,973,133 | 2/1961 | Newton | 417/282 |
| 3,023,765 | 3/1962 | Gresko | 137/102 |
| 3,034,441 | 5/1962 | Wachsmuth | 417/494 |
| 3,043,495 | 7/1962 | Hewitt | 417/28 |
| 4,060,340 | 11/1977 | Yanik | 417/28 |
| 4,505,648 | 3/1985 | Heger | 417/297 |
| 4,553,907 | 11/1985 | Heger | 417/297 |
| 4,710,108 | 12/1987 | Soupal | 417/298 |

FOREIGN PATENT DOCUMENTS

| | | |
|---|---|---|
| 940852 | 11/1963 | Fed. Rep. of Germany . |
| 914770 | 8/1954 | United Kingdom . |
| 2049823 | 12/1980 | United Kingdom . |
| 2063382 | 3/1981 | United Kingdom . |
| 2951305 | 7/1981 | United Kingdom . |

OTHER PUBLICATIONS

Service Manual—Cummins Air Compressors; Bulletin 983422-B, dated 7/63; See exploded view and section 4 on Cylinder Head Disassembly and rebuild.

Primary Examiner—Leonard E. Smith
Assistant Examiner—Eugene L. Szcecina, Jr.
Attorney, Agent, or Firm—Dykema Gossett

[57] ABSTRACT

A compressor unloaded system for use in compressed air supply systems having reciprocating type air compressor means supplied with atmospheric or turbocharged air is shown. Means are provided to block off the air intake of such compressors, and to maintain back pressure against the exhaust valve of said air compressor during an unloading cycle, thereby preventing operation of the intake and exhaust valves of such compressor, and creating an "air spring" in the cylinder of such air compressor during an unloading cycle.

48 Claims, 9 Drawing Sheets

4,993,922

AIR COMPRESSOR UNLOADER SYSTEM

BACKGROUND OF THE INVENTION

I. Field of the Invention

The present invention relates generally to air supply systems using reciprocating type air compressors and, more particularly, to compressor unloading systems usable in such systems when they are used with and without an air dryer such as might be found in air supply systems for truck air brakes and the like. It is well known in the art that in such systems the air compressor operates in its pumping mode for only a short period of time, and that it is operated in what is known as an unloaded mode for approximately 70-90 per cent of the time. How to unload the air compressor to save horsepower when the compressor is not pumping, without having other problems occur, has been a long standing problem in the art.

II. Description of the Prior Art

Air compressors used in medium and heavy duty vehicle air supply systems, such as those found in transport trucks, passenger buses, and the like, generally involve having an air compressor directly driven by the vehicle engine and supplied with inlet air at atmospheric pressure, or, in the case of many transport trucks today, turbocharged air from the engine turbocharger via the engine air intake manifold.

These air compressors generally are one, two or four cylinders in nature. The earliest attempts at internally unloading the air compressor in regard to two cylinder compressors was to simply hold the intake valves for both cylinders open and pump air back and forth between the cylinders, and this was relatively satisfactory when there was no concern with the fuel cost or the horsepower being lost.

With single cylinder air compressors, the earliest unloading method simply involved holding the intake valve open so that air was pumped in and out through the compressor intake opening.

In the European countries, the approach to the problem was somewhat different, and while the intake valve was left untouched, the compressor pumped all the time while the unloading function was performed external to the compressor via a separate diverted type system called an unloader valve. This method of unloading is now generally viewed as unsatisfactory because of the noise produced, and the horsepower losses incurred. Thus, design and development work focused on better ways to unload air compressors other than simply holding the intake valve open.

In many cases, when the intake valve was held open on a single cylinder and compressor and the compressor was supplied with naturally aspirated air, which was common at the time, since the compressor intake was supplied with a separate air cleaner, pumping back and forth through the air cleaner in many cases destroyed the air cleaner, or reduced its efficiency so it would not perform for the purpose for which it was intended.

This caused the truck manufacturers to switch to a system supplied with turbocharged inlet air from the engine turbocharger to avoid the air cleaner problems and assure a clean inlet air supply, but it was then found that when unloading in the conventional way, by holding the intake valve open, the faster the engine was running, the denser the air, and the more horsepower was lost due to the unloading. Thus, the search continued for a satisfactory solution to the problem.

A clutched compressor recently developed was not felt to be the answer to the horsepower loss problem because the compressor shaft normally runs through the compressor and often drives other accessories, such as the power steering, or engine fuel pump, and it was not satisfactory to have the power steering and other items nonfunctional for the time the compressor was unloaded. Also, the clutched compressor would substantially increase the cost of the air supply system, and this was not satisfactory. Thus, not much progress was made in developing a more efficient compressor unloading system, and until the present invention, the expedient of simply holding the intake valve open to allow unloading either to atmosphere, or the engine turbocharger, is the accepted way of unloading the air compressor.

This method of compressor unloading is known to be unsatisfactory when turbocharged inlet air is utilized for several reasons, including the loss of up to five (5) horsepower under certain operating conditions, the diversion of a significant amount of engine intake air through the compressor and air dryer out to the atmosphere when the compressor is in the unloading mode, and now with the advent of the air dryer in medium and heavy duty vehicle air brake systems, there is an inordinate loss of engine power, increased oil consumption, and waste of fuel in the unloading mode. Because of these new problems, past solutions were no longer acceptable by the engine and compressor makers, and much additional work and invention had to take place in the field of air compressor unloader systems before a satisfactory solution was arrived at. The inventions which have now been made, are disclosed and claimed in the present application, and in a copending application in which we are the inventors entitled RING VALVE TYPE AIR COMPRESSOR.

SUMMARY OF THE INVENTION

In order to solve the aforementioned longstanding problems in the prior art, and provide a more efficient compressor unloading system for use with heavy duty air supply systems, it has been found unexpectedly desirable to create an "air spring" within the cylinder of the reciprocating air compressor means used in such air supply systems. While conventional thinking would lead one away from doing any "work" during the unloading cycle, since the whole idea of unloading the compressor is to avoid "pumping" while the compressor is unloaded, it has been found that if done properly, the energy used in the unloaded compression cycle of the air compressor is almost completely recovered during what would normally be the unloadaed expansion cycle, as will be more fully explained later.

This is accomplished by either mechanical or pneumatic means to effectively prevent the intake and exhaust valves, which are generally of the pressure operated spring type, from operating during the unloading cycle. In the disclosed embodiment, a mechanical means stops the spring-type, pressure operated intake valve from operating by blocking the compressor intake, while a pressure operated means, including an isolation valve for use with air dryer equipped air system, effectively stops the exhaust valve of the air compressor from operating, thereby creating the air passage. Thus, in addition to using very little horsepower during the unloading operating cycle, as indicated in FIG. 5b embodiments disclosed operate in the above manner, it is well within the scope of the present invention that any practicable means can be used to create the air spring in the compression chamber, whether direct acting mechanical means are used, or other means such as the isolation valve disclosed. The present invention may also be used on any type of fluid pump requiring an unloader.

Thus, it is an object of the present invention to provide a more efficient method and apparatus for unloading air compressors used in air supply systems.

It is a further object of the present invention to provide an efficient air compressor unloading system which is economical to manufacture.

It is a further object of the present invention to provide a method of converting existing compressor unloading systems to ones using the present invention, with a minimum of expense.

It is a still further object of the present invention to provide an air compressor unloading system which will significantly reduce the horsepower used by air compressors in their unloaded mode.

It is a further object of the present invention to provide an air compressor unloading system usable both on naturally aspirated and turbcharged air compressors.

It is a further object of the present invention to provide a compressor unloading system usable both with ring valve and spring type valve reciprocating air compressors, as well as any other type of reciprocating air compressor.

It is a further object of the present invention to provide an isolation valve which will maintain pressure on the exhaust valve of the compressor and prevent its operation when the compressor is in the unloading mode for systems utilizing an air dryer.

It is a further object of the present invention to provide an isolation valve of the foregoing nature which is of simple construction, and which is automatically actuated in the unloading mode.

It is a further object of the present invention to provide a compressor unloading system which does not cause excessive amounts of oil to pass around the compressor piston rings when the compressor is in its unloading mode.

Further objects and advantages of the present invention will be apparent from the following description and appended claims, reference being made to the accompanying drawings forming a part of the specification, wherein like reference characters designate corresponding parts in the several views.

It is to be understood that the present invention is not limited to the details of construction and arrangement of parts illustrated in the accompanying drawings, since the invention is capable of other embodiments, and of being practiced or carried out in various ways, within the scope of the claims. Also it is to be understood that the phraseology and terminology employed herein is for the purpose of description, and not of limitation.

DETAILED DESCRIPTION OF THE PREFERRED EMBODIMENTS OF THE PRESENT INVENTION

Figure 1:
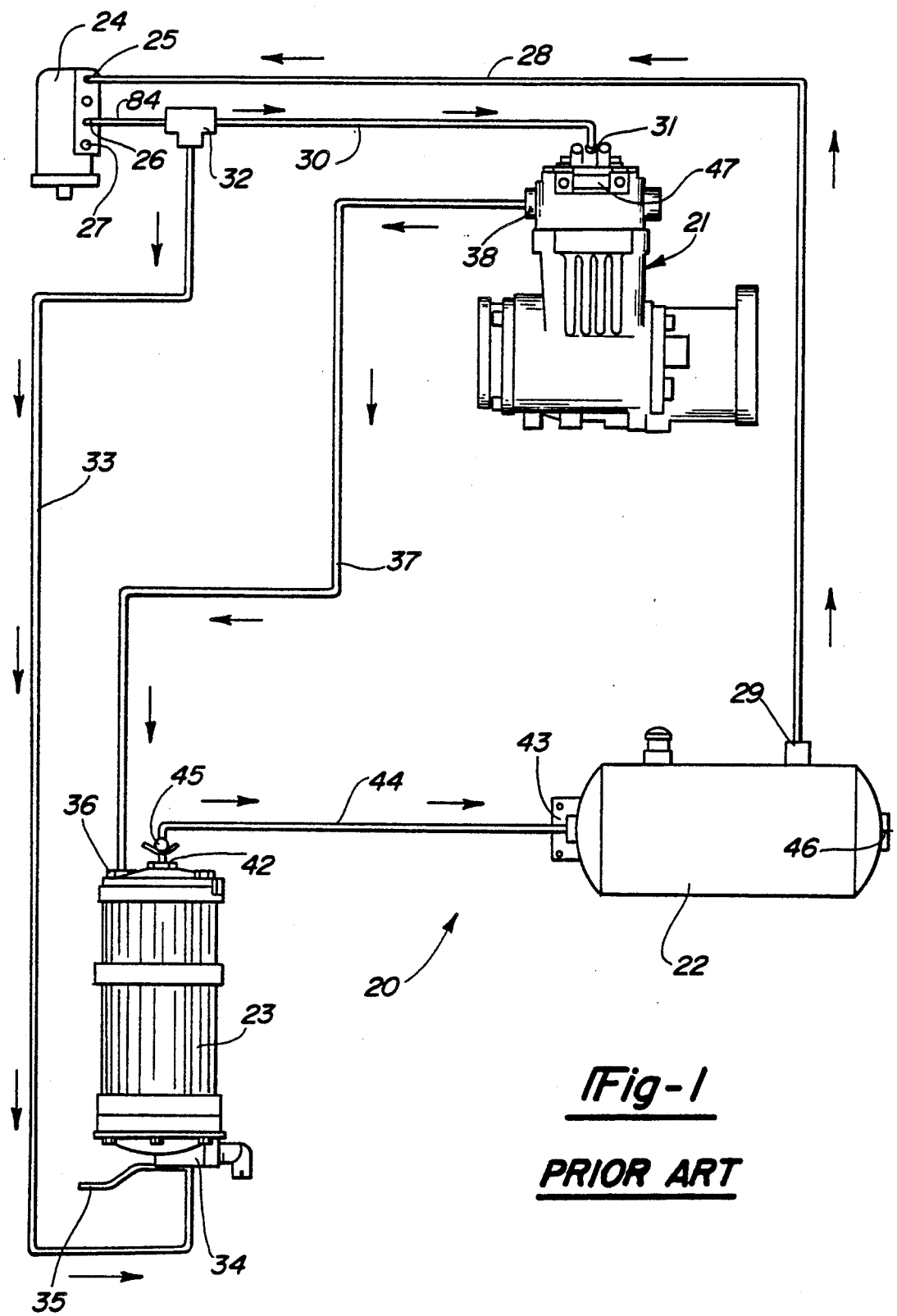
FIG. 1 is a diagrammatic view of a prior art air compressor unloading system for use where an air dryer is included in the system.

Referring now to FIG. 1, there is shown a prior art air compressor unloading system, generally designated by the numeral 20. The unloading system 20 includes an air compressor 21, an air reservoir or wet tank 22, an air dryer 23 and an air governor 24.

The air governor 24 has a reservoir port 25, an unloader port 26, and an exhaust port 27. The governor 24 is of conventional design, and may be preset by means well known in the art to respond to certain operating conditions required by the system, whether the compressor is naturally aspirated, or fed turbocharged air from the engine turbocharger. The reservoir port 25 is connected by first conduit 28 to the signal outlet port 29 of the reservoir 22. The unloader port 26 of the air governor 24 is connected by a second conduit 30 to a conventional unloading device 31 through a first T connector 32 and conduit 84. A third conduit 33 provides fluid communication between the first connector, and thus the unloader port of the air governor 24, and the spitter valve 34 of the air dryer 23. The spitter valve 34 is also manually operable by means of the handle 35. The inlet 36 of air dryer 23 is connected to and, therefore, is in fluid communication with the exhaust 38 of compressor 21 by means of the fourth conduit 37. The outlet 42 of air dryer 23 is connected to the inlet 43 of the air reservoir 22 by means of a fifth conduit 44 through check valve 45.

It is contemplated that the major application of our compressor unloader system will be for use in medium and heavy duty vehicle air brake systems, and thus, for purposes of illustration, both the prior art and the present invention are illustrated as they may be applied to such medium and heavy duty vehicle air brake systems, although it should be understood that the present unloader system can be used for any reciprocal type air compressor, and thus for any system which utilizes such a compressor.

In this regard it should be understood that the reservoir 22 is normally what is also referred to in compressed air systems as a wet tank, which is intended to be the first tank of a plurality of tanks used in an air brake system, and is the one which collects the majority of the water incident to air compressor operations Other tanks, known as dry tanks, or primary and secondary tanks, may be located downstream of the principal outlet 46 of the reservoir 22.

Before explaining the operation of the prior art compressor unloading system, it should be understood that prior to about the 1950's air dryers 23 were not in widespread use and thus, the fourth conduit 37 would be connected directly from the exhaust 38 to the reservoir inlet 43 and, of course, third conduit 33 would not be necessary. In the unloading mode, the conventional unloading device 31 would simply hold the intake valve open, and the pressure in the fourth conduit 37 would prevent operation of the exhaust valve of the compressor, and air would simply pass into and out of the compressor intake 47.

This system worked fine for many years until the demand for more durable air brake systems caused air dryers such as 23, to come into widespread use. As soon as air dryers came into use, however, an immediate increase in oil consumption by the air compressor occurred, the reason for which was not understood for many years. We have now discovered the cause of this problem and explain it below, together with the solution.

In systems with air dryers, as shown in FIG. 1, the air dryer 23 has the spitter valve 34 connected by third conduit 33 to be in fluid communication with the unloader port 26 of the conventional air governor 24. When the compressor is in its pumping mode, the system simply works with the signal outlet port 29 of the air reservoir 22 being in fluid communication with the reservoir port 25 of the air governor through the first conduit 28, with no pressure being supplied to the conventional unloader device 31, so that compressed air from the compressor 21 simply passes out the exhaust 38, through the fourth conduit 37, to the inlet 36 of the air dryer 23, and out through the check valve 45, through fifth conduit 44, to the reservoir inlet 43. When the compressor has filled the air reservoir 22 to the desired pressure, the air governor 24, by means well known in the art, causes fluid communication to occur between the reservoir port 25 and the unloading port 26, therefore, letting the pressure in the air reservoir 22 operate the unloading device 31 to keep the inlet valve of a conventional air compressor in the open condition, causing the cylinder to pump in and out through the inlet 47 of the air compressor 21.

However, at the same time that air pressure was being supplied to the unloading device 31, it was also being supplied to the spitter valve 34 of the air dryer 23 by virtue of the first T connector 32 providing fluid communication by way of conduit 84 and third conduit 33 with the unloader port 26 of the air governor This opens the exhaust 38 to atmosphere through the spitter valve 34 during the unloaded mode instead of maintaining the exhaust pressure on the exhaust valve as in the old system without the air dryer 23.

Figure 5A:
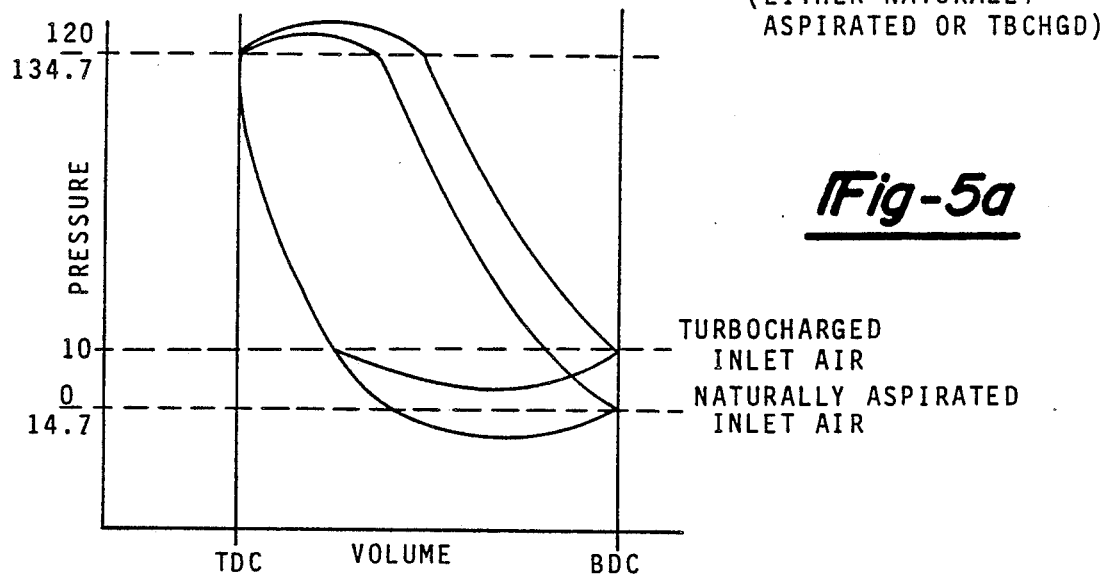
FIG. 5a is a graph showing a comparison of air compressor cylinder volume versus cylinder pressure during a 360° crank cycle for the pumping mode showing naturally aspirated inlet air and inlet air pressurized by the engine turbocharger to 10 psig.
Figure 5B:
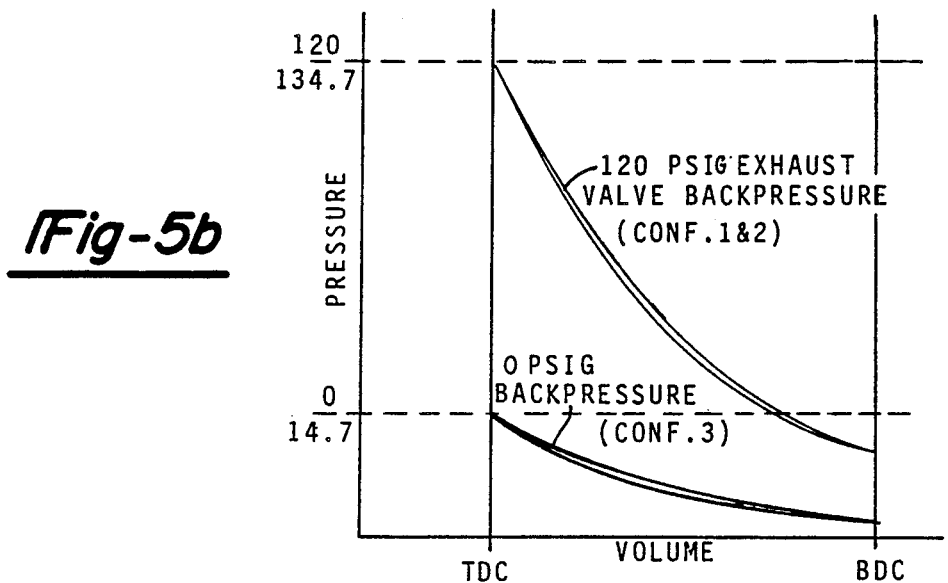
FIG. 5b is a graph showing cylinder volume versus cylinder pressure for the disclosed air spring unloading system during a 360° crank cycle for the following configurations:
 (1) air dryer equipped system with isolation valve;
 (2) non-air dryer equipped system (no isolation valve required);
 (3) air dryer equipped system without isolation valve.
Figure 5C:
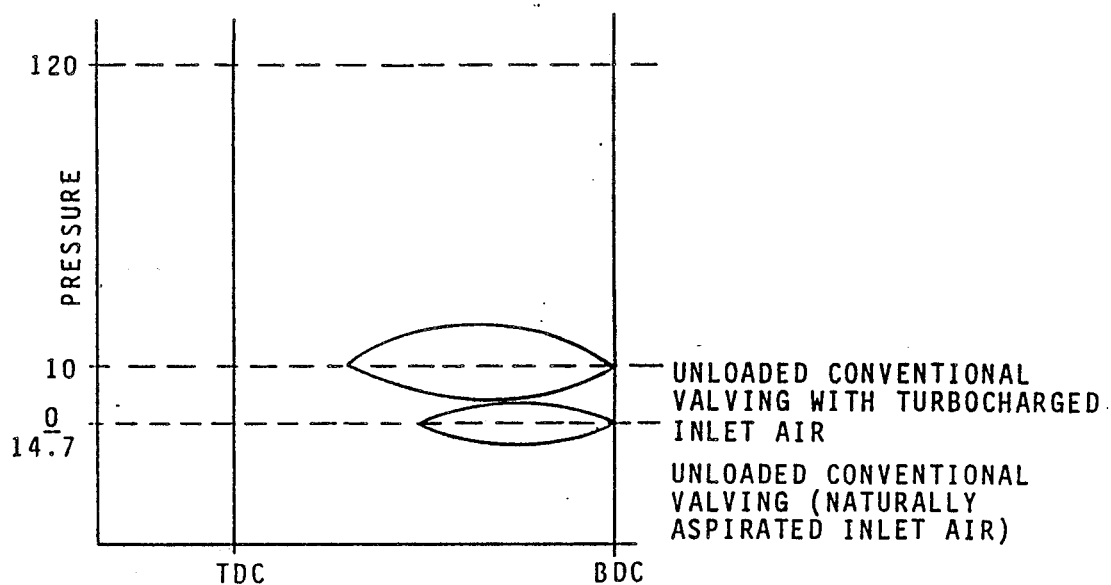
FIG. 5c is a graph showing a comparison of air compressor cylinder volume versus cylinder pressure for a naturally aspirated air compressor and a 10 psig turbocharged air compressor, both using conventional unloading systems during a 360° crank cycle.

The problems this caused can be seen by referring to FIGS. 5a through 5c. FIG. 5a shows two curves, that of a naturally aspirated air compressor and of a turbocharged air compressor, in their pumping (loaded) mode during a 360° crank cycle. It can be seen that for a naturally aspirated compressor (whether conventionally unloaded, or unloaded according to the present invention) there is a short period of time during the stroke between top dead center and bottom dead center in the pumping mode, due to the pressures necessary for operation of the spring loaded valves, when the pressure above the cylinder is below 0 psig, which is lower than the pressure in the compressor crankcase, which encourages oil to bypass the piston rings and be pumped out the exhaust. It can be seen that a solution to this problem was thought to be to turbocharge the air compressor, i.e. connect the inlet of the air compressor to the engine turbocharger, which raises the curve. However, this was found to cause an increase in horsepower loss during the unloading mode for conventionally unloaded air compressors which can be seen by referring to FIG. 5c which shows the same curves shown in FIG. 5a for two conventionally unloaded compressors—during unloaded operation, where the horsepower loss is represented by the total area enclosed by the curves.

Figure 4:
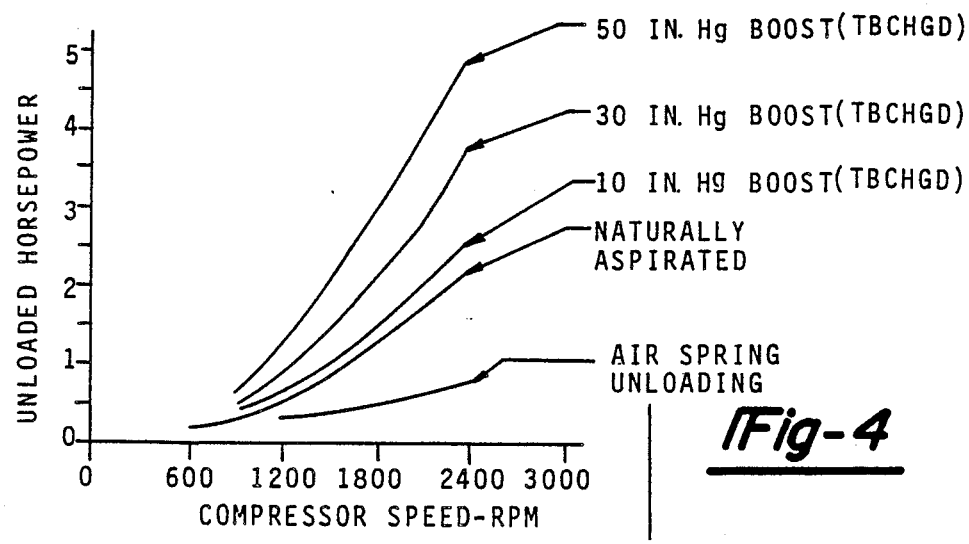
FIG. 4 is a graph showing a comparison of air compressor speed versus horsepower loss for the present invention, and prior art air compressor unloading systems.

A curve such as 5c is known by those skilled in the art to show, as represented by the area within the curve, the horsepower being consumed by the conventionally unloaded air compressor in its unloaded mode. It can be seen that the turbocharged air compressor in its unloaded mode uses much more horsepower than does the naturally aspirated compressor, and as the turbocharge pressure is increased, the horsepower used in the unloaded mode will increase, as shown in FIG. 4. Thus, the solution of the turbocharging of the air compressor to eliminate the oil loss was only partially satisfactory, and as greater and greater concern about fuel economy was evidenced in the trucking industry, research had to continue as to how to eliminate the oil loss without increasing the horsepower loss.

As shown by the lowermost curve in FIG. 4, our invention has achieved the horsepower draw reduction by completely changing the way an air compressor is unloaded. As shown in FIG. 5b, there are 2 curves showing cylinder volume versus cylinder pressure during a 360° crank cycle for the present invention where the upper curve represents the situations identified as configurations (1) and (2) on the figure of an:

(1) air dryer equipped system with isolation valve, and (2) non-air dryer equipped system without an isolation valve (not required for this configuration), with a 120 psig exhaust valve back pressure, which holds the exhaust valve closed at cylinder pressures below this 120 psig level. The pressurized air captured within the cylinder bore by the closed intake and exhaust valves, thus creates an "air spring" within the compressor, wherein the energy expended during the compression cycle of the air compressor in an unloaded mode is largely gained back during the expansion cycle.

The lower curve of FIG. 5b shows the situation where the present invention is used with an air dryer equipped system without an isolation valve, identified as configuration (3) on the figure.

By comparing the two curves, oil passage problems are dramatically increased using the present invention with an air dryer equipped system which purges to atmosphere, without the isolation valve installed due to the venting of exhaust line pressure during unloaded operation which purges the air dryer to atmosphere reducing exhaust valve back pressure to zero psig, thereby causing a pressure differential and oil migration from the compressor crankcase upward past the rings to be subsequently pumped into the air system during the next loaded (pumping) cycle.

Further comparison of the two curves shows the situations (1 and 2) where back pressure is maintained, at 120 psig, on the exhaust valve, operates for a much smaller period of time below zero psig, thereby reducing oil passage. Thus, in addition to using very little horsepower during the unloaded operating cycle, as indicated in FIG. 5b by the very small areas enclosed by the curves versus the conventional unloading systems horsepower draw represented by the enclosed areas of FIG. 5c, the present invention has virtually eliminated the oil passage problem.

It is critical to the present invention that the isolation valve be utilized to maintain system, back pressure and the compressor exhaust valve in the case where an air dryer is used in the system, otherwise the air compressor will function as an oil pump drawing oil past the rings from the crankcase on a continuous bases during unloaded operation due to the pressure differential between the cylinder bore and compressor crankcase oil pump. How this is accomplished, can be seen by referring to FIGS. 2, 3, 6 and 7.

Figure 6:
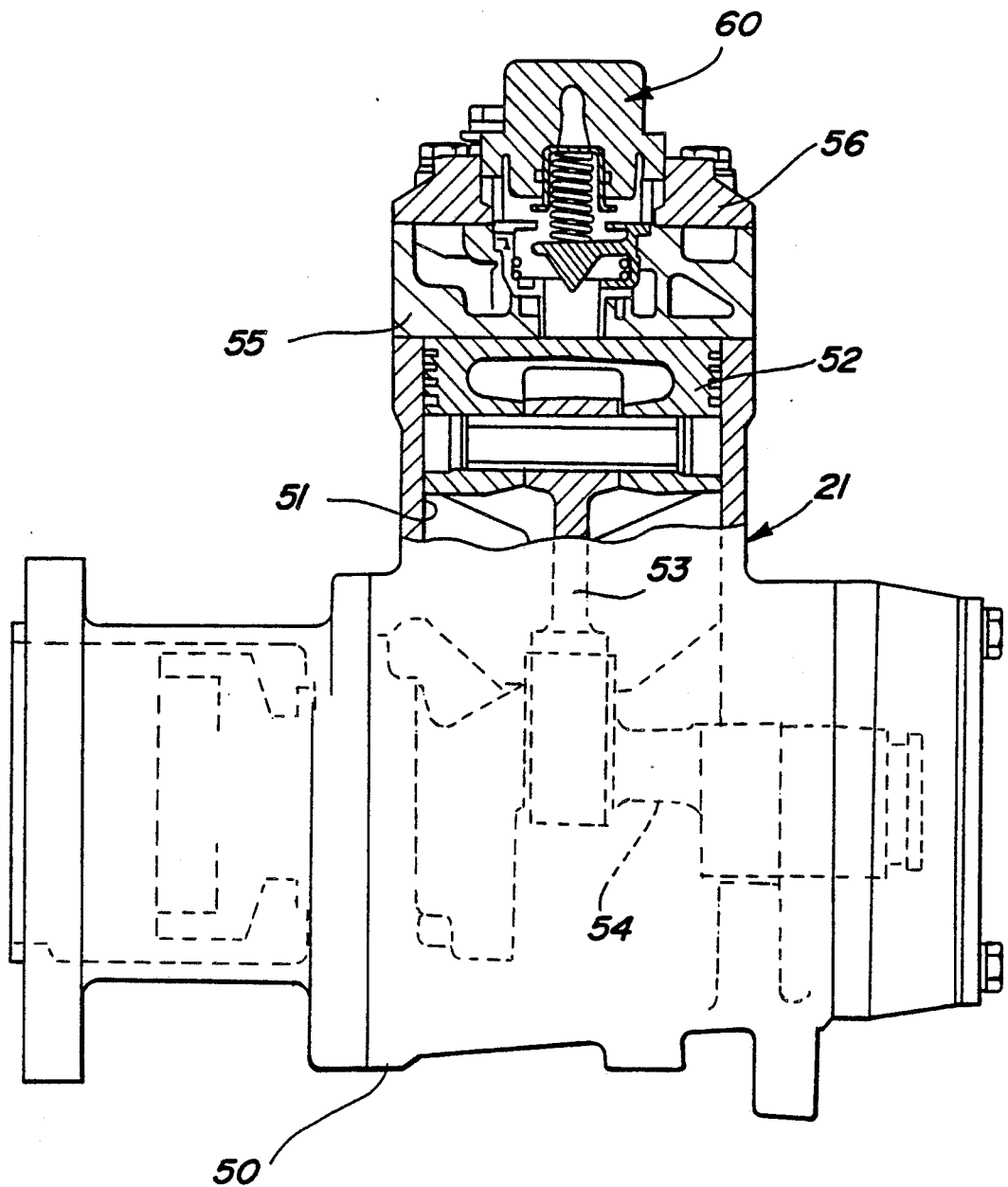
FIG. 6 is an elevational view, partially cut away, of an air compressor utilizing a top hat unloader, and having conventional spring type (pressure operated) valves.
Figure 7:
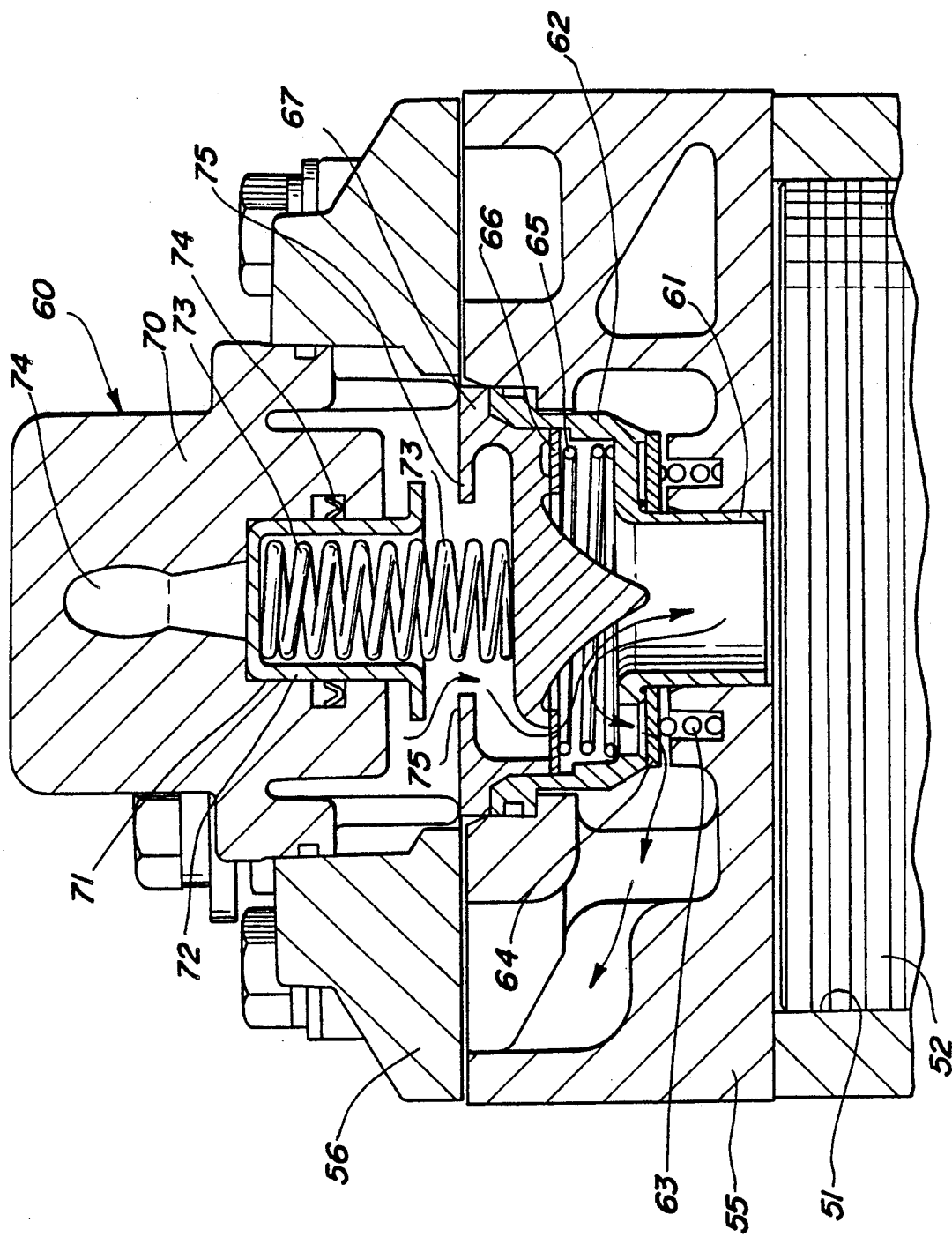
FIG. 7 is an enlarged view of the cylinder head and unloader device shown in FIG. 6.

Referring first to FIGS. 6 and 7, there is shown one type of air compressor which may be used in the present invention. The air compressor, generally designated by the numeral 21, has a housing 50 with a cylinder 51 formed therein. In cylinder 51, there is mounted a piston 52 for reciprocative movement on the piston rod 53 which is rotatably attached to the crankshaft 54. A cylinder head 55 closes off the cylinder 51. The cylinder head 55 is closed by a cover 56 to which is mounted a top hat unloader generally designated by the numeral 60.

Referring more particularly to FIG. 7, it can be seen that there are a plurality of passages in cylinder head 55 including an internal cavity 61 adapted to receive an exhaust valve seat 62 which is positioned in place after the exhaust valve spring 63 and the exhaust valve 64 are assembled in place. The intake valve spring 65 is then assembled in place, as is the intake valve 66 and then the intake valve seat 67 is assembled. The illustration shown in FIG. 7 illustrates the condition when the compressor is at rest, and the piston 52 is at top dead center with the top hat unloader 60 inoperative. It can now be seen that when the piston 52 is moving in a downward direction, when sufficient vacuum is created, the intake valve spring 65 will be forced in a downward direction by the intake valve 66 which will then become unseated from the intake valve seat 67 and allow air to flow into the cylinder in the direction of the arrows.

Similarly, when the piston 52 begins its compression stroke, the intake valve 64 will be forced back up against the intake valve seat 67 blocking the intake of the air compressor. At the same time this is occurring, since air can no longer escape through the intake valve 66, the exhaust valve 64 is forced in a downward direction by the air pressure created in cylinder 51, which cannot escape through the intake. Instead it unseats the exhaust valve 64 from the exhaust valve seat 62, and allows the compressed air to exit the compressor in the direction shown.

To create an air spring within the cylinder 51 of the air compressor 21, it is first necessary to block the intake to prevent operation of the intake valve 66. This is accomplished by providing an unloader body 70, having an unloader cylinder cavity 71 formed therein, in which is sealingly mounted a top hat 72, sealed by the compression seal 74. For purposes of clarity, other seals which are used to seal the intake valve seat, the exhaust valve seat and the unloader body are omitted. An unloader spring 73 interposed between the interior of the top hat 72 and the intake valve seat 67 keep the top hat normally retracted until air pressure is introduced into the air chamber 74 communicating with the unloader port 26 (not shown) When air is introduced into the air chamber 74, the top hat 72 compresses the unloader spring 73 to move the top hat 72 in a downward direction and close the intake at 75. Thus, it can be seen that when the air governor 24 causes fluid communication between the reservoir port 25 and the unloader port 26, pressure from the air reservoir 22 travels from the signal outlet port 29 through the first conduit 28 into the air governor 24 at the reservoir port 25, and out of the air governor through the unloader port 26 through the first T connector 32, conduit 84, and the second conduit 30 to the top hat unloader 60, preventing operation of the intake valve 66, and taking the first step needed to create an air spring within the cylinder 51.

Top hat unloaders of the general type just described were in use in the 1950's and up to 1967 in compressors manufactured by the Cummins Engine Company Incorporated of Columbus, Ind., the parent of Applicants' Assignee. However, its use and utility in a compressor unloading system was not realized until many years after the top hat unloader went out of production in 1967. It should also be understood that the top hat unloader used in the present invention is different than the earlier top hat unloader in that it was found that the rim of the top hat had to be smaller to present a smaller area on which the intake pressure would act. Failure to do this, it was found would prevent the compressor from loading because the pressure on the rim, combined with the vacuum below, would be too strong for the unloader spring to overcome. Also, the unloader spring had to be increased to a 27 pound spring, whereas a 15 pound spring is typically used in an unloader.

Having determined after much experimentation that the creation of an "air spring" would solve both the oil consumption problem and horsepower loss problems of the prior art compressor unloading systems, and having provided a satisfactory means to prevent operation of the intake valve of the typical air compressor, our next problem was how to effectively prevent operation of the exhaust valve to finish the creation of the air spring in the cylinder by capturing air at system pressure.

Our next, and successful, attempt involved preventing the operation of the exhaust valve by maintaining the back pressure on the exhaust valve during the unloading cycle for the situation where air dryers are used, when the air dryer 23 was venting to atmosphere through the spitter valve 34, this being determined to be the portion of the cycle where the major oil loss occurred The solution first tried for blocking the exhaust 38 of the air compressor 21 was to simply put a valve in the fourth conduit leading from the exhaust to the air dryer in the prior art system shown in FIG. 1.

However, it was found that before the valve could be operated by the air governor 24, the pressure in fourth conduit 37 would drop sufficiently to allow the piston to operate the exhaust valve 64 causing the aforementioned passage of oil past the pistons into the exhaust. Thus, it was determined that it was needed, in addition to isolating the exhaust 38 from the air dryer 23, to supply make up air back through the fourth conduit 37 through the exhaust 38 of the air compressor. This was accomplished by the supplying of the isolation valve generally designated by the numeral 90, and connecting the same in the manner shown in FIG. 2.

The isolation valve 90 has a housing 91 having an internal cavity 92 formed therein In addition, housing 91 is provided with a first port 93 communicating with the internal cavity 92, and connected by means of the fourth conduit to the exhaust 38 of the compressor, and is in fluid communication therewith. A second port 94 also communicates with internal cavity 92, and is in fluid communication with the inlet 36 of the air dryer through the fifth conduit 80. A third port 95 is in fluid communication with the air governor 24 through conduit 84, the first T connector 32, the seventh conduit 83, the second T connector 81 and the sixth conduit 82. As before, the third conduit 33 is in fluid communication with the air governor 24, but in this instance it is through the second T connector 81, the seventh conduit 83, the first T connector 32 and the conduit 84.

The isolation valve is illustrated when our system is in the loaded condition, and compressed air is passing from the exhaust 38 through the fourth conduit 37, the first port 93, the internal cavity 92, the second port 94 and the fifth conduit 80 to the inlet 36 of the air dryer 23 and therethrough through the air reservoir 22. When it is desired to unload the compressor, it is necessary to block off the aforementioned path from the exhaust to the air dryer, and at the same time supply air pressure from the unloader port 26 of the air governor 24 to the fourth conduit 37. This is accomplished by the specialized construction of our isolation valve 90.

The housing 91 has formed therein a valve seat 94a at the upper end of second port 94 adapted to receive the rounded end 97a of primary valve member 97 when said valve member is forced in the downward position by air supplied from the air governor 24 through the third port 95.

The housing 91 includes an upper portion 91a, which may be threadably attached by external threads 96 being provided on the upper portion 91a meshing with internal threads 98 provided in the main body of the housing 91. At the lower end 92 of the upper portion of the housing 91a is provided a tubular portion 91b. The tubular portion 91b terminates within the internal cavity 92 above the junction of the cavity with the first port 93. The upper end of the tubular portion 91b terminates at the collar 98 which is provided with the third port 95. The interior of the tubular portion is adapted to slidably accommodate the upper end 97b of the primary valve member 97. Primary valve member 97 is also provided with an external collar 97b which is positioned below the lower end of tubular portion 91b when the primary valve member 97 is in its closed position. When the primary valve member is in its open position, the first port and the second port respectively of housing 91 are interconnected. When the primary valve member 97 is in its closed position, the first port 93 and the third port 95 are in fluid communication.

Primary valve member 97 is provided with an internal passage 100 having an upper end which terminates at the third port 95, and a lower end which terminates within the primary valve member 97 at a transversely extending lower segment 102. Lower segment 102 terminates at the exterior of the primary valve member 97 and is in continuous communication with the internal cavity 92.

Disposed within the internal passage 100 is a secondary valve member 103 which is adapted to move between blocking and unblocking positions relative to the upper segment 101. The secondary valve member 103 includes a ball 104 and a valve seat 105. Valve seat 105 is adapted to be fitted within the upper section 101 of the internal passage 100 and has a smaller bore than internal passage 100.

When the compressor 21 is operating in its pumping, or normal, mode, compressed air exits from the exhaust 38 through the fourth conduit 37 into the first port 93 and naturally causes the primary valve member 97 to move upward to its open position allowing air to pass through the internal cavity and out the second port to the air dryer 23. At the same time this is happening, the ball 104 is forced upwardly against the valve seat 105, thus, blocking off fluid communication with the air governor 24.

However, when the compressor is operating in its unloaded mode, and the third port 95 is in fluid communication with the reservoir port 26 of the air governor 24, the air pressure entering third port 95 causes primary valve member 97 to move in a downward direction to its closed position against valve seat 94a, thus blocking the flow of the compressed air through the exhaust 38 and the fourth conduit 37 to the air dryer 23. The exhaust valve 64 remains in its closed position because of the force of the exhaust valve spring 63 and the pressure captured within the fourth conduit 37. It has been found that the captured air pressure within the fourth conduit 37 is approximately 65 per cent of the air reservoir pressure immediately after unloading. Because the pressure in the fourth conduit 37 is only 65 per cent of the pressure present at the unloader 26 of the air governor 24, which is in fluid communication with the third port 95 of the isolation valve 90, the ball 104 will unseat causing the pressure within the fourth conduit 37 to be quickly replenished by the pressurized air of the reservoir. This pressure differential will simultaneously be applied to the larger surface area of the collar of the valve seat 105 and cause the primary valve member 97 to automatically move downwardly within the internal cavity 92 until the rounded end 97a thereof engages the valve seat 94a and closes off the second port 94, thus, as previously mentioned, blocking the flow of compressed air to the air dryer. Primary valve member 97 and secondary valve member 103 move automatically when the compressor operation varies between the normal and unloading modes.

Figure 2:
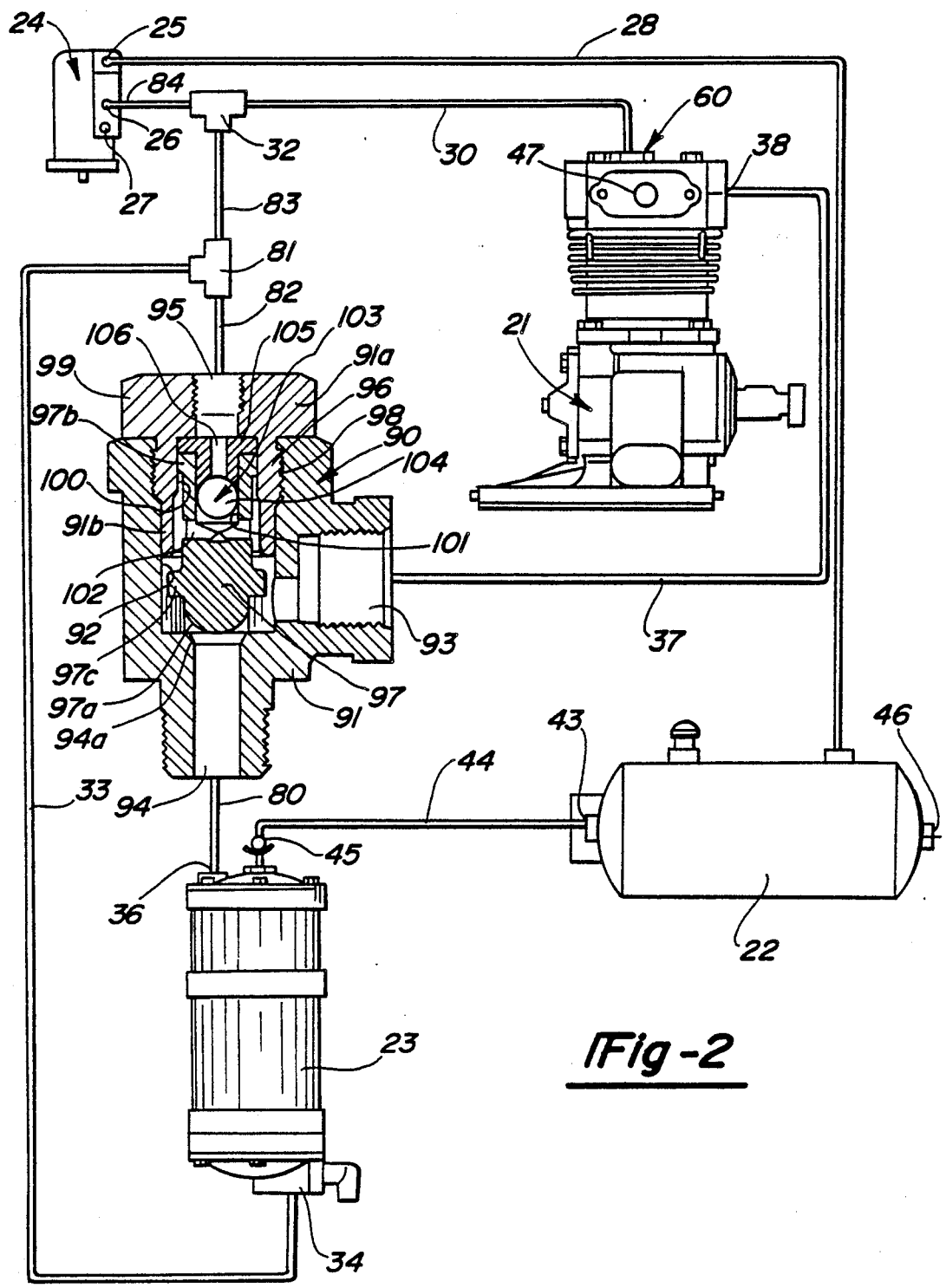
FIG. 2 is a diagrammatic view of one embodiment of an air compressor unloading system embodying the present invention with an isolation valve, for use where an air dryer is included in the system.

The solution to providing back pressure on the exhaust valve shown in FIG. 2 proved to be only partially successful, however, as the durability of the isolation valve was limited. Problems arose involving damage to the ball 104 and the valve seat 105 due to a hammering action which is believed to occur because of air pulsations received due to the pumping action of the air compressor 21. While it is believed that the system shown in FIG. 2 would be satisfactory for two cylinder air compressors, or for systems wherein additional devices are installed between the compressor and the isolation valve to reduce the sharp pressure pulsations experienced with single cylinder air compressors, it is believed that the system shown in FIG. 3 provides a completely satisfactory solution to the problem, and is usable under all conditions.

Figure 3:
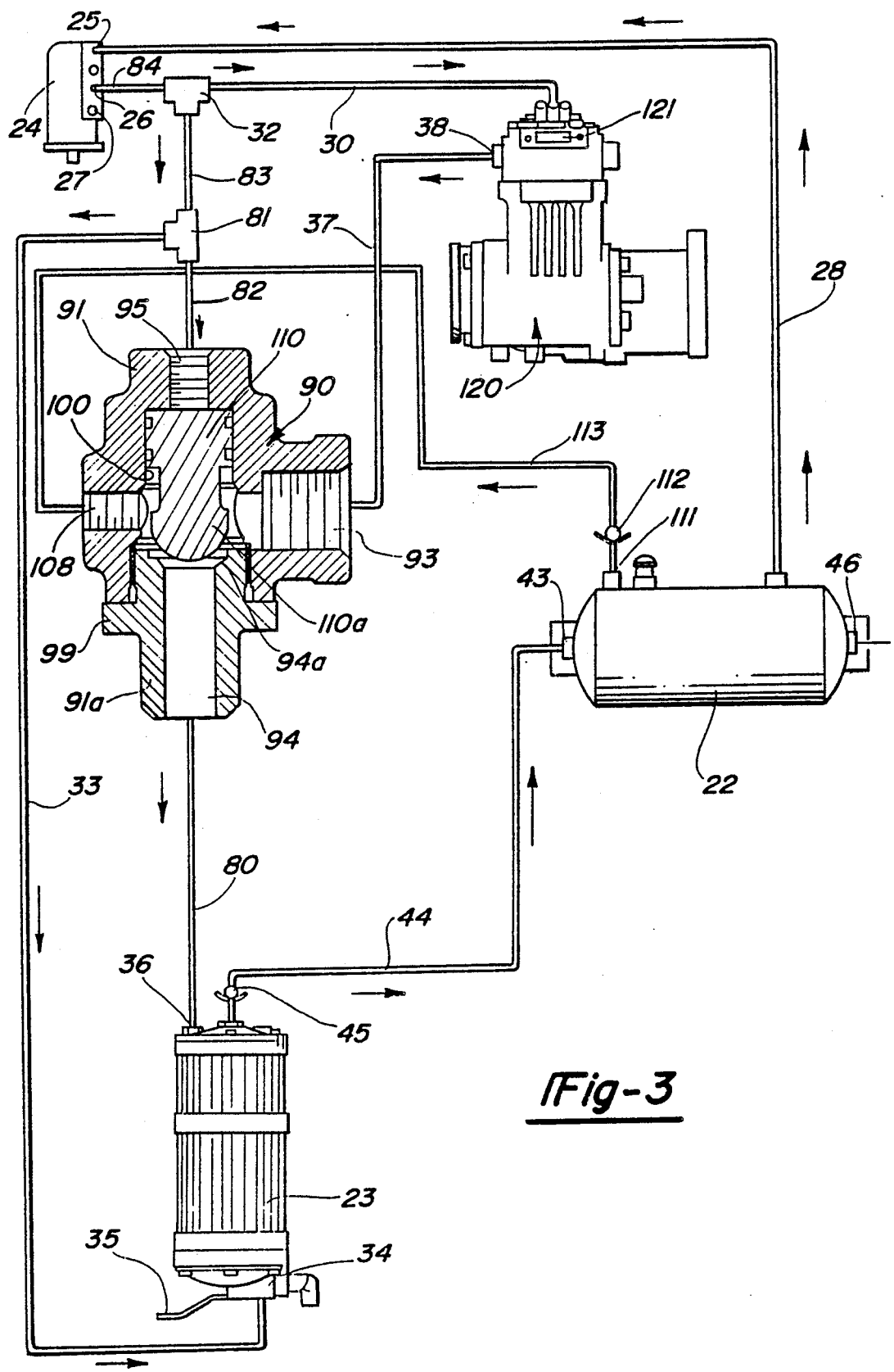
FIG. 3 is a diagrammatic view of another construction embodying the present invention with an isolation valve for use where an air dryer is included in the system.

The changes shown to the system in FIG. 3 involve, in essence, making the primary valve member 97 shown in FIG. 2 of a solid construction. This solid primary valve member is now indicated by the numeral 110 in FIG. 3 and the rounded end thereof which fits against the valve seat 94a is now indicated by the numeral 110a.

As can be seen, the first port 93, the second port 94 and the third port 95 are still in communication with the internal passage 100 substantially in the same manner as before, even though the arrangement of the parts of the isolation valve 90 have been somewhat changed as illustrated.

In order to make up for the loss of the air pressure in the fourth conduit 37, and therefore, to continue to prevent the exhaust valve 64 from operating, a make up air port 111 is now provided in the reservoir 22 and a make up air conduit 113 operating through check valve 112 is in fluid communication with a fourth port 108 provided in the isolation valve 90. To provide for ease of manufacture, the isolation valve housing 91 now contains the first port 93, the third port 95, and the fourth port 108, with the second port being provided in lower portion 91a having collar 99. Thus, any drop in pressure in the fourth conduit 37 is immediately made up by air supplied through the make up air conduit 113. The relative size of make up conduit 113 is relatively small compared to a fourth conduit 37, and the exact size will depend upon the application selected.

Also shown in FIG. 3 is a different type of compressor, because as mentioned before, our system may be used with any reciprocating type air compressor. Shown in FIG. 3 is a ring valve air compressor 120 which is the subject of a separate patent application filed on even date herewith, and under common ownership with the present application. Because of the nature of the ring valve air compressor, which is described more completely in regard to FIGS. 8 and 9, an external unloader 121 is needed to close off the intake of said compressor, and prevent the operation of the intake valve thereof, to create the first step toward forming the air spring in the cylinder of said compressor.

Figure 8:
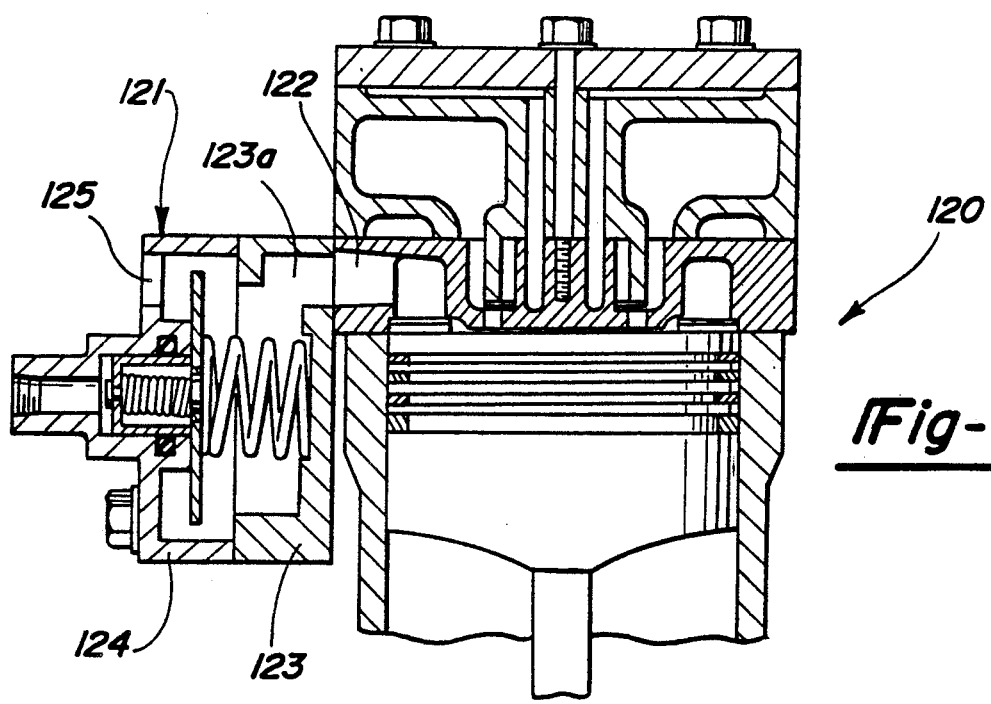
FIG. 8 is a partial elevational view, in section, showing a ring valve type air compressor usable in the present invention.
Figure 9:
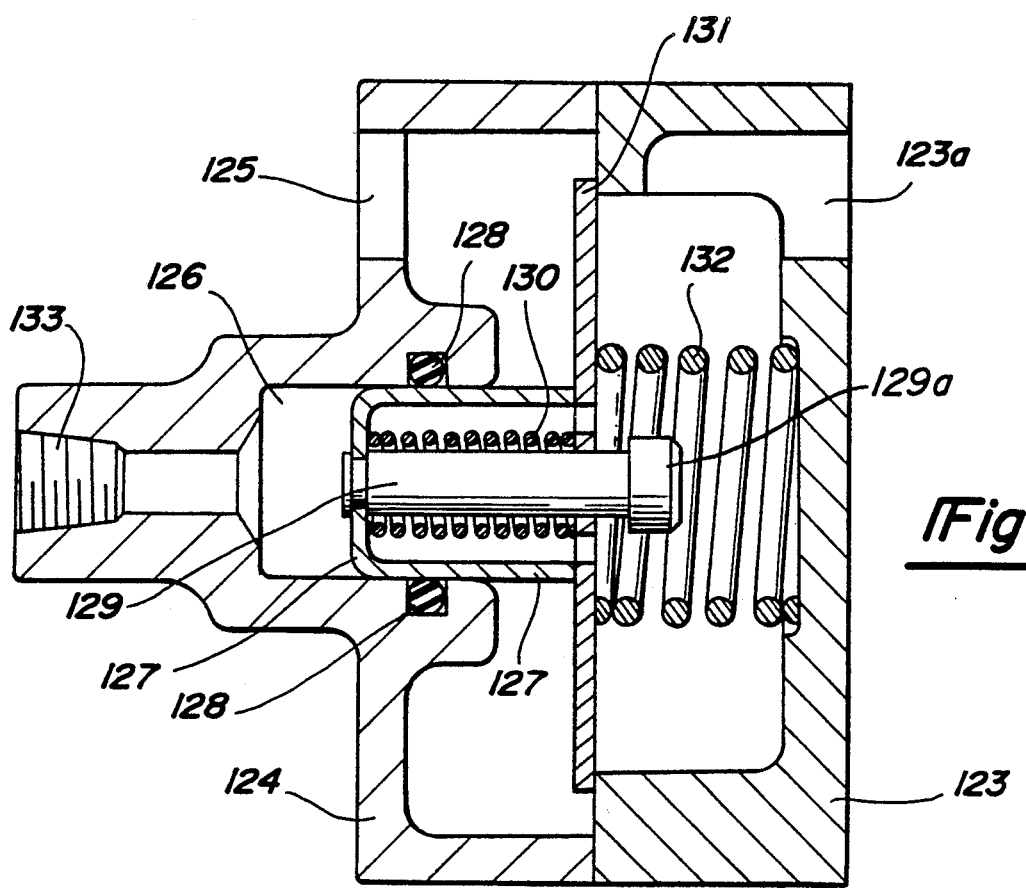
FIG. 9 is an enlarged view of the external air compressor unloader attached to the compressor shown in FIG. 8.

Referring now to FIGS. 8 and 9, there is shown a ring valve type air compressor with an external unloader, as well as a separate external unloader device which may be adapted for use in converting existing air compressors to the present unloading system when their internal unloading devices can not be modified to isolate the intake of the compressor from the compression chamber.

There is shown a valve body 123 which is mounted over the intake 122 of the ring valve type air compressor 120. The manifold 123 has an internal cavity 123a in fluid communication with the intake 122. A valve body 124 having an intake 125 is mounted to the manifold 123 to completely enclose the internal passage 123a thereof. There is mounted for reciprocative movement in said valve body a valve 131 which will close off the internal cavity 123a of the manifold in its closed position, but allows fluid communication between the internal cavity and atmosphere through the valve body intake 125 in its open position. The valve 131 is restrained between the enlarged end 129a of the piston rod 129 fixedly mounted to the cylinder 127 and the unloader spring 130. This will allow for some movement of the piston 127 before the valve 131 is moved by the movement of the cylinder. To assist in the movement of the valve 131 is a valve spring 132 restrained between the valve 131 and the manifold 123. The piston 127 is sealingly mounted within the cylinder bore 126 by the compression seal 128. The cylinder bore 126 communicates with unloader port 133 so that when air pressure is supplied through the unloader port 26 of the air governor 24, the piston 127 moves downwardly in the cylinder as shown in FIG. 9 to isolate the compressor intake 122 from the compression chamber of the ring valve type air compressor 20 by preventing operation of the intake valve thereof similarly to the way the unloader worked in the system previously described.

Figure 10:
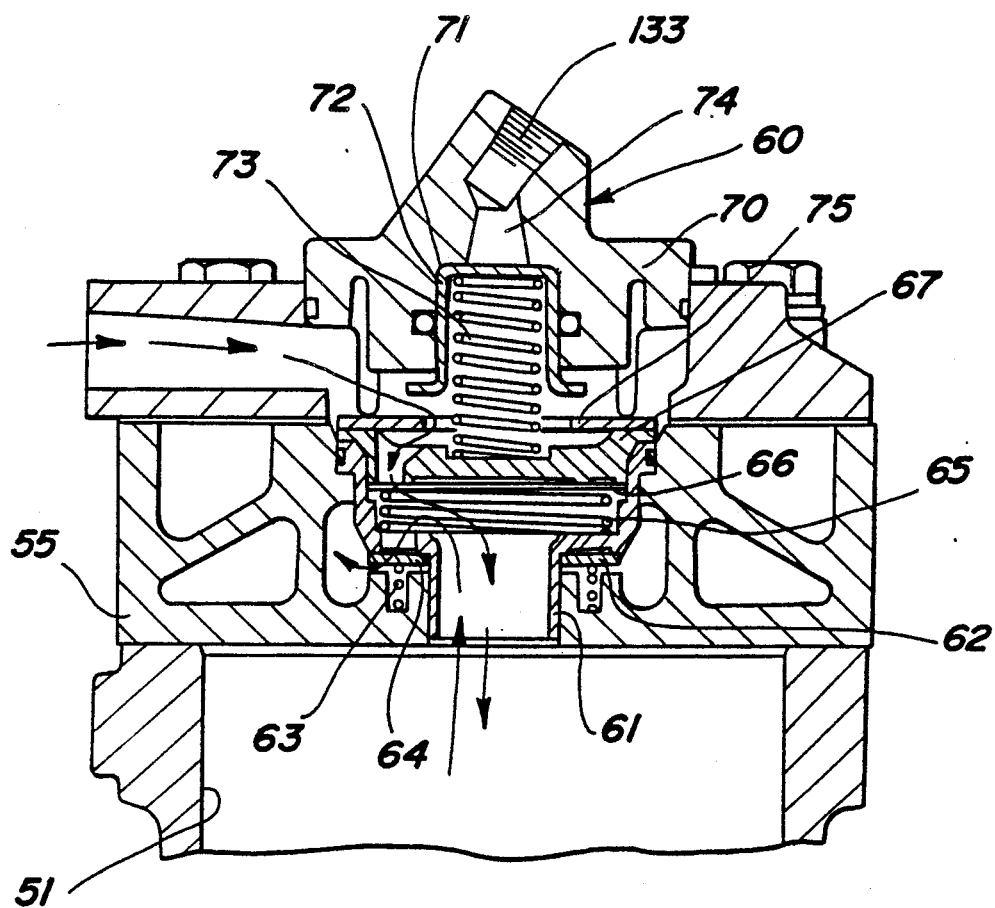
FIG. 10 is a view similar to FIG. 7, but showing a modified cylinder head design usable when a direct mount air governor is used.

FIG. 10 is a view similar in large part to FIG. 7, but showing a modification of the unloader housing which may be used when a direct mount air governor is to be used in our compressor unloading system. In this case the unloader port 133 is angled with respect to the axis of the compressor cylinder to provide for the mounting of the direct mount air governor (not shown).

Our improved air compressor unloading system may also be retrofitted to conventional air compressor unloading systems either by modifying the existing compressor unloader system to replace the conventional unloader which holds the intake valve open during an unloading cycle with a top hat unloader 60 such as previously described, which it is possible to do with the aforementioned Cummins air compressors, or by disabling the existing unloading device and installing an external unloader over the intake of the air compressor where such modifications are not possible. In either case, the exhaust valve 64 will still be prevented from operating by the back pressure maintained in the fourth conduit 37 connected to the exhaust 38 of the air compressor. Thus, by modifying an existing unloader device on an existing compressor, or disabling said unloader device and installing an external unloader, and interposing an isolation valve 90 between the exhaust of the air compressor and the air dryer, and having the same operated as illustrated by air from the air governor 24 when the compressor is in its unloaded mode, we have also disclosed a method of modifying an existing air compressor unloading system to eliminate horsepower loss and oil loss.

Thus, by carefully analyzing the longstanding problems in the prior art concerning the providing of air compressor unloading systems, and by undertaking extensive experimentation involving many attempts to solve such problems, we have finally developed a novel air compressor unloading system which involves the unique step of forming an "air spring" inside a reciprocating type air compressor by preventing the operation of the intake and exhaust valves of said air compressor, either mechanically or pneumatically, thus solving the longstanding problems in the prior art of horsepower loss and excessive oil consumption.

We claim:

1. An air compressor unloading system including:
   (a) a reciprocating air compressor means having a compression chamber, an inlet to said compression chamber, and an outlet from said compression chamber;

(b) means to block said inlet and said outlet during a compressor unloading cycle in a manner to create an air spring in said compression chamber, by capturing system air pressure in the cylinder bore and head assembly.

2. An air compressor unloading system including, in combination:
(a) a reciprocating air compressor means having a pressure operated intake valve and a pressure operated exhaust valve:
(b) means to prevent the operation of said pressure operated intake valve during an unloading cycle;
(c) means to prevent the operation of said pressure operated exhaust valve during a compressor unloading cycle;
thereby creating an air spring in said compression chamber during an unloading cycle.

3. An air compressor unloading system including, in combination:
(a) a reciprocating air compressor means having a compression chamber, an intake in fluid communication with said compression chamber, and an exhaust in fluid communication with said compression chamber;
(b) means to block said intake to said compression chamber;
(c) means to block said exhaust from said compression chamber;
(d) means to control connected to said means to block;
(e) a reservoir connected to said means to control; and
(f) an air dryer connected to said reservoir and said means to block said exhaust.

4. The system defined in claim 3, wherein said means to block said exhaust from said compression chamber include:
an isolation valve connected to said air dryer, said means to control, and said exhaust of said air compressor means.

5. The system defined in claim 4, wherein said isolation valve includes:
(a) a valve housing including:
   i. an internal cavity;
   ii. a first port communicating with said cavity and said exhaust;
   iii. a second port communicating with said cavity and said air dryer; and
   iv. a third port communicating with said cavity and said means to control; and
(b) a pneumatically responsive primary valve means mounted within said cavity for movement between open and closed positions relative to said second port, said primary valve means being provided with an internal passage having one end thereof in communication with said third port, and a second end in communication with said internal cavity, and a pneumatically responsive secondary valve means mounted within said passage for independent movement between passage blocking and unblocking positions, said secondary valve means being in said blocking position and said primary valve means being in said open position when the compressor is in the pumping (loaded) mode: said secondary valve means being in an unblocking position, and said primary valve means being in said closed position when said compressor is in the unloading mode and the reservoir and unloader ports of the governor are in fluid communication with one another.

6. The isolation valve of claim 5, wherein the primary valve means has a rounded end portion thereof in engagement with a valve seat formed in said cavity when the primary valve means is in a fully closed position and the compressor is in the unloaded mode.

7. The isolation valve defined in claim 5, wherein the second and third ports of the housing are in substantial alignment with one another.

8. The isolation valve of claim 5, wherein the valve housing is of composite construction and includes a body section having the first and second ports and a bore formed therein, the bore having an inner end terminating within the body section adjacent the second port thereof, and an outer end terminating at the exterior of the body section, and an end section removably mounted on the body section at the bore outer end; said end section having a protruding, tubular segment disposed in sealing engagement within a portion of said bore, said tubular segment coacting with the remainder of the bore to form the housing internal cavity, said end section including an exposed end segment provided with an opening communicating with the cavity in defining the housing third port.

9. The isolation valve of claim 5, wherein, the compressor is in an unloading mode and the reservoir and unloader ports of the means to control are in fluid communication with one another, the primary and secondary valve means are adapted to be simultaneously responsive to the pneumatic pressure of the reservoir affecting movement of the primary valve means to the closed position, and movement of the secondary valve means to an unblocking position.

10. The isolation valve of claim 9, wherein the primary valve means has a greater surface area exposed to the reservoir pneumatic pressure than that of the secondary valve means.

11. The isolation valve of claim 4, wherein the primary valve means includes a shuttle slidably mounted within said housing cavity, said shuttle having a rounded end adapted, when said primary valve means is in the closed position, to sealingly engage a valve seat disposed adjacent said housing second port.

12. The isolation valve of claim 11 wherein the shuttle is elongated and provided with an internal passage, the latter including a first segment extending longitudinally from an end of the shuttle opposite the closed end thereof, and having an inner end terminating within the shuttle interior, and a second segment extending angularly from the inner end of the first segment to the exterior of the shuttle at a location longitudinally spaced from the shuttle closed end; the pneumatically responsive valve means disposed within the passage sealingly engaging a valve seat formed within one of the passage segments when said secondary valve means is in the blocking position.

13. The isolation valve of claim 8, wherein the secondary valve means is adjustably mounted within the passage first segment, said first segment being provided with a valve seat piece, the latter including a tubular segment extending towards the passage second segment and terminating within the passage first segment, and being sealingly engaged by the secondary valve means when the latter is in the blocking position.

14. The isolation valve of claim 13, wherein the secondary valve means includes an imperforate ball movable between at least the terminating end of the tubular portion of the valve seat piece and the inner end of the passage, first segment when the secondary valve means is moving between blocking and unblocking positions.

15. An isolation valve system in combination with a piston type air compressor operable in loaded (pumping) and unloading (non-pumping) modes and having pneumatically responsive means actuated during the unloading mode to block said compressor air intake to prevent operation of said compressor intake valve, said compressor including an exhaust port and an intake port, the latter being in communication with the pneumatically responsive means; a reservoir for pressurized air having an inlet port, a primary outlet port, and a signal outlet port; and an air governor having a reservoir port in communication with the reservoir signal outlet port, an unloader port in communication with the compressor unloader port, and an exhaust third port, the governor being preset to effect communication between the reservoir and unloader ports thereof when the compressor is operating in the unloading mode; said isolation valve comprising a housing provided with an internal cavity, a first port communicating with said internal cavity and communicating with the compressor exhaust port, a second port communicating with said internal cavity and communicating with the reservoir inlet port, and a third port commmunicating with said internal cavity and communicating with said governor unloader port; a pneumatically responsive primary valve means mounted within said cavity for movement between open and closed positions, said primary valve means being provided with an internal passage having one end thereof in communication with the housing third port and a second end in communication with said housing cavity; and a pneumatically responsive secondary valve means mounted within said passage for independent movement between passage blocking and unblocking positions; said secondary valve means being in said blocking position and said primary valve means being in said open position when said compressor is in the pumping loaded mode; said secondary valve means being in said unblocking position and said primary valve means being in said clossed position when said compressor is in the unloading mode and the reservoir and unloader ports of the governor are in communication with one another, thereby forming an air spring within the cylinder of said air compressor by capturing system air pressure in the cylinder bore and head assembly.

16. The isolation valve of claim 15, wherein the second port of the isolation valve housing communicates with an inlet port formed in an air dryer and the reservoir inlet port communicates with the outlet port formed in the air dryer.

17. The system defined in claim 5, wherein said means to block said compressor intake from said compression chamber includes a means to bias the intake valve of said air compressor means in a closed position during an unloading cycle.

18. The system defined in claim 17, wherein said means to bias include an unloading device.

19. An air compressor unloading system including, in combination:
    (a) an air compressor having an inlet port, an exhaust port, and an unloading device;
    (b) an air governor having a reservoir port, an unloader port, and an exhaust port, with said unloader port being in fluid communication with said compressor unloader device;
    (c) a reservoir having a signal outlet port, a principal outlet, and an inlet, with said signal outlet port being in fluid communication with said governor reservoir port;
    (d) an isolation valve having a third port in fluid communication with said unloader port of said air governor, a first port in fluid communication with said exhaust of said air compressor, and a second port; and
    (e) an air dryer having an inlet and an outlet, with said outlet in fluid communcation with said inlet of said reservoir, and said inlet in fluid communication with said second port of said isolation valve.

20. The system defined in claim 19, and further including:
    (a) a spitter valve mounted on said air dryer and communicating with the interior thereof; and
    (b) valve means to operate said spitter in fluid communication with said unloader port of said air governor.

21. The system defined in claim 20, wherein said isolation valve further includes a housing provided with an internal cavity, a first port in fluid communication with said cavity adapted to communicate with said exhaust of said compressor, a second port communicating with said internal cavity and in fluid communication with said air dryer inlet port, a third port communicating with said internal cavity and in fluid communication with said unloader port of said air governor; a pneumatically responsive primary valve means mounted within said housing cavity for movement between open and closed positions, said primary valve means being provided with an internal passage having one end thereof in communication with the housing third port, and a second end in communication with said housing cavity; and a pneumatically responsive secondary valve means mounted within said passage for independent movement between passage blocking and unblocking positions, said secondary valve means being in said blocking position, and said primary valve means being in the open position, when said compressor is in the normal mode; said secondary valve means being in an unblocking position, and said primary valve means being in said closed position, when said compressor is in an unloading mode and the resevoir and exhaust ports of the governor are in communication with one another, thereby creating an air spring within the cylinder of said air compressor by capturing system air pressure in the cylinder bore and head assembly.

22. The system defined in claim 21, wherein said primary valve means has a rounded end portion thereof in engagement with a valve seat formed in the housing cavity when the primary valve means is in a fully closed position and the compressor is in the unloaded mode.

23. The system defined in claim 21, wherein the second and third ports of the housing are in substantial alignment with one another.

24. The system defined in claim 21, wherein the valve housing is of composite construction and includes a body section having the first and second ports and a bore formed therein, the bore having an inner end terminating within the body section adjacent the second port thereof, and an outer end terminating at the exterior of the body section, and an end section removably mounted on the body section at the bore outer end; said end section having a protruding tubular segment disposed in sealing engagement within a portion of said bore, said tubular segment coacting with the remainder of the bore to form the housing internal cavity, said end section including an exposed end segment provided with an opening communicating with the cavity in defining the housing third port.

25. The system defined in claim 21, wherein when the compressor is in an unloading mode and the reservoir and unloader ports of the governor are in communication with one another, the primary and secondary valve means are adopted to be simultaneously responsive to the pneumatic pressure of the reservoir, effecting movement of the primary valve means to a closed position and movement of the secondary valve means to an unblocking position.

26. The system defined in claim 25, wherein the primary valve means has a greater surface area exposed to the reservoir pneumatic pressure than that of the secondary valve means.

27. The system defined in claim 21, wherein the primary valve means includes a shuttle slidably mounted within said housing cavity, said shuttle having a rounded end adapted, when said primary valve means is in the closed position, to sealingly engage a valve seat disposed adjacent said housing second port.

28. The system defined in claim 27, wherein the shuttle is elongated and provided with the internal passage, the latter including a first segment extending longitudinally from an end of the shuttle opposite the rounded end thereof, and having an inner end terminating within the shuttle interior, and a second segment extending angularly from the inner end of the first segment to the exterior of the shuttle at a location longitudinally spaced from the shuttle closed end; the pneumatically responsive secondary valve means disposed within the passage sealingly engaging a valve seat formed within one of the passage segments when said secondary valve means is in the blocking position.

29. The system defined in claim 28, wherein the secondary valve means is adjustably mounted within the passage first segment, said first segment being provided with a valve seat piece, the latter including a tubular segment extending towards the passage second segment and terminating within the passage first segment and being sealingly engaged by the secondary valve means when the latter is in the blocking position.

30. The system defined in the claim 29 wherein the secondary valve means includes a ball movable between at least the terminating end of the tubular portion of the valve seat piece and the inner end of the passage first segment when the secondary valve means is moving between blocking and unblocking positions.

31. The system defined in claim 21, wherein said unloading device is a top hat unloader.

32. The system defined in claim 19, and further including a make up air port on said reservoir in fluid communication with said first port of said isolation valve.

33. The system defined in claim 32, wherein said isolation valve further includes:
(a) a housing provided with an internal cavity, said cavity in fluid communication with said first port, said second port, and said third port;
(b) a pneumatically responsive primary valve body mounted within said cavity for movement between open and rounded positions, said primary valve means being in the open position when said air compressor is in the pumping (loaded) mode, and said primary valve means being in closed position when said compressor is in an unloaded mode and the reservoir and unloader ports of said air governor are in communication with one another, thereby forming an air spring within the cylinder of said air compressor.

34. The system defined in claim 33, wherein the primary valve means has a rounded end portion thereof in engagement with a valve seat formed in the housing cavity when the primary valve means is in a fully closed position and the compressor is in the unloaded mode.

35. The system defined in claim 33, wherein the second and third ports of the housing are in substantial alignment with one another.

36. The system defined in claim 31, wherein when the compressor is in an unloaded mode and the resevoir and exhaust ports of the governor are in communication with one another, the primary valve means are adapted to be responsive to the pneumatic pressure of the reservoir effecting movement of the primary valve means to a closed position.

37. A method of improving the efficiency of existing pneumatic systems of the type including a reciprocating air compressor adopted to run in a normal and in an unloaded mode and having an intake and exhaust, an unloading device, and an air dryer said method including the steps of:
(a) providing a means in said pneumatic system to substantially block said exhaust of said air compressor from the compression chamber when desired;
(b) modifying said unloading device to cause said device to substantially block said intake when desired; and
(c) operating said means to block and said modified unloading device substantially simultaneously when it is desired to unload said air compressor in a manner to create an air spring within the cylinder of said air compressor during said unloading mode by capturing system air pressure in the cylinder and head assembly.

38. A method of improving the efficiency of an existing pneumatic systems of the type including a reciprocating air compressor adapted to run in normal and unloaded modes and having an intake, an exhaust, an unloading device, and an air dryer said method including the steps of:
(a) disabling said existing unloading device if it cannot be modified to block said intake when desired;
(b) providing a means in said pneumatic system to substantially block said exhaust of said air compressor when desired;
(c) providing a means in said pneumatic system to substantially block said intake of said air compressor when desired;
(d) operating said intake blocking and said exhaust blocking devices substantially simultaneously when it is desired to unload said air compressor, thereby creating an air spring within the cylinder of said compressor during said unloading mode by capturing pressurized air within the cylinder bore cavity at or below system pressure.

39. An isolation valve for use in a pneumatic system having an air compressor adapted to operate in the pumping (loaded) and unloaded modes and having first, second and third ports, an air dryer having inlet and outlet ports, an air storage reservoir for air having an inlet port, an outlet port a make up air port and a signal outlet port, the reservoir inlet port being in fluid communication with said air dryer outlet port, and a governor having a reservoir port, an unloader port and an exhaust port, the governor being adapted to effect select communication between the ports thereof under preset conditions, said isolation valve comprising a housing provided with an internal cavity, a first port in fluid communication with said cavity and adapted to communicate with said compressor exhaust, a second port in fluid communication with said cavity adapted to communicate with said air dryer inlet port, a third port in fluid communication with said internal cavity adapted to communicate with said governor unloader port, a solid pneumatically responsive primary valve means mounted within said housing cavity for movement between open and closed positions, said primary valve means being in said open position when said compressor is in the pumping (loaded) mode, and said primary valve means being in said closed position when said compressor is in an unloading mode and the reservoir port and the unloader port of said air governor are in fluid communication with one another, thereby creating an air spring within the cylinder of said air compressor by capturing system air pressure within the cylinder bore and head assembly.

40. The isolation valve defined in claim 39, wherein said primary valve means has a rounded end portion thereof in engagement with a valve seat formed in said internal cavity when the primary valve means is in the fully open position and the compressor is in the unloaded mode.

41. The isolation valve defined in claim 39, wherein said second and said third ports of said housing are in substantial alignment with one another.

42. The isolation valve defined in claim 39, wherein, when said air compressor is in an unloading mode, and the reservoir and unloader ports of said air governor are in communication with the other, the primary valve means are adapted to be simultaneously responsive to the pneumatic pressure of the reservoir, effecting movement of the primary valve means to a closed position.

43. An isolation valve in combination with a reciprocating type air compressor operable in normal pumping and unloading modes and having pneumatically responsive means actuated during the unloading mode to retain a compressor air intake valve in a closed condition, said compressor including an intake port and an exhaust port, said intake port being in fluid communication with said pneumatically responsive means; a reservoir of charged air having an inlet port, a make up air port, a primary outlet port, and a signal outlet port; and an air governor having a reservoir port in fluid communication with said reservoir signal outlet port, an unloader port in communication with said pneumatically responsive means and an exhaust port, said air governor being preset to effect communication between said reservoir port and said unloader ports thereof when said compressor is operating in the unloading mode, said isolation valve comprising a housing provided with an internal cavity, a first port in fluid communication with said internal cavity and said compressor exhaust port, a second port communicating with said internal cavity and being in fluid communication with said reservoir inlet port, a third port in fluid communication with said internal cavity and with said unloader port of said air governor; and a make up air port in communication with said internal cavity, and said pneumatically responsive means a pneumatically responsive primary valve means mounted within said cavity for movement between open and closed position, said primary valve means being in said open position when said compressor is in the pumping mode, and being in said closed position when said compressor is in the unloading mode, and said reservoir and said unloader ports of said governor are in communication with one another, said make up air port of said fluid reservoir being in fluid communication with said make up air port of said isolation valve to provide for make up air, thereby exerting fluid pressure on said exhaust port and preventing operation of the exhaust valve of said compressor when said primary valve means of said isolation valve is in the closed position during an unloader operation.

44. The isolation valve defined in claim 43, wherein the second port of the isolation valve housing communicates with an inlet port formed in an air dryer and the reservoir inlet port communicates with a discharge port formed in said air dryer.

45. The isolation valve defined in claim 39, wherein the valve housing is of composite construction and includes a body section having said first, said third and said make up ports and a bore formed therein, the bore having one end terminating adjacent the second port thereof and the other end terminating within the body section adjacent said third port, and a lower section removably mounted to the body section and coacting with the remainder of the bore to form the housing internal cavity, said end section provided with an opening communicating with the cavity and defining the housing third port.

46. The compressor unloading system described in claim 1, wherein said air compressor means is a ring valve type air compressor having an external unloading means to block said inlet.

47. The air compressor unloading system defined in claim 2, wherein said reciprocating air compressor means is a ring valve type air compressor having an external unloading means to block said intake during a compressor unloading cycle.

48. The air compressor unloading system defined in claim 19, wherein said air compressor is a ring valve type air compressor and said unloading device is an external unloading device.

* * * * *

UNITED STATES PATENT AND TRADEMARK OFFICE
CERTIFICATE OF CORRECTION

PATENT NO. : 4,993,922

DATED : Feb. 19, 1991

INVENTOR(S) : Lauterbach, Ritchie & Miller

It is certified that error appears in the above-identified patent and that said Letters Patent is hereby corrected as shown below:

In column 20, Claim 43, Line 14, please insert -- normal -- before pumping mode,.

Signed and Sealed this

Twenty-fifth Day of May, 1993

Attest:

MICHAEL K. KIRK

*Attesting Officer*    Acting Commissioner of Patents and Trademarks